United States Patent [19]

Chang

[11] Patent Number: 5,786,938
[45] Date of Patent: Jul. 28, 1998

[54] KALEIDOSCOPE STRUCTURE

[76] Inventor: Lung-Hsi Chang, No. 24. Ln 66. Sec. 1. Yen Ping N. Rd.. Taipei. Taiwan

[21] Appl. No.: 864,744

[22] Filed: May 29, 1997

[51] Int. Cl.$^6$ .................................................. G02B 27/08
[52] U.S. Cl. ........................................................... 359/617
[58] Field of Search ..................................... 359/616, 617

[56] References Cited

U.S. PATENT DOCUMENTS

| | | | |
|---|---|---|---|
| 1,662,743 | 2/1928 | Hanson | 359/617 |
| 4,262,441 | 4/1981 | Wolf | 46/1 R |
| 5,229,884 | 7/1993 | Kelderhouse et al. | 359/616 |

*Primary Examiner*—Eddie C. Lee
*Assistant Examiner*—Christopher E. Mahoney
*Attorney, Agent, or Firm*—Rosenberg. Klein & Bilker

[57] ABSTRACT

A kaleidoscope includes a cylindrical barrel having a top open end and an opposite bottom open end and a top cover and a bottom cover, both having a circumferential wall to be force fit onto the top end and the bottom end of the barrel. The top cover has a hollow triangular frame formed on an inside surface thereof. The bottom cover has formed on an inside surface thereof a flake container in the form of a triangle inside which a plurality of colorful and reflective flakes and other small objects are received in a loose and movable manner. A transparent lid is also received within the flake container to confine the flakes inside the container. A recess is thus defined inside the flake container by the opening of the container and the transparent lid. A prism which is received within the barrel and has a first end fit into the triangular frame of the top cover and a second end fit into the recess inside the container of the bottom cover is releasably secured between the top and bottom covers. An observing window is provided on the top cover to observe the flakes through the prism. The prism defines a space with the barrel for storage of small articles which are received through a slot formed on the top cover. An access hole is provided on the bottom cover and is openably closed by a rubber plug.

7 Claims, 4 Drawing Sheets

5,786,938

KALEIDOSCOPE STRUCTURE

FIELD OF THE INVENTION

The present invention is related generally to a kaleidoscope and in particular to a knock-down kaleidoscope having an interior space of receiving and storing small articles.

DESCRIPTION OF THE INVENTION

Kaleidoscopes are a popular toy which generates a variety of different attractive and wonderful patterns by means of a prism and colorful and reflective flakes and objects which are contained in a container formed inside the kaleidoscope. However, the conventional kaleidoscope is a toy but nothing, providing no other uses. Very commonly for having not been attractive, an old kaleidoscope is always disposed. Disposing the old kaleidoscopes obviously leads in environmental protection problem.

Conventionally, the kaleidoscopes are manufactured, sold and stored as a single piece with the parts un-detachable therefrom. This increases the difficulty of manufacture and the cost. Further, such a single piece structure also increases transportation and storage cost.

Thus, it is desirable to provide an improved kaleidoscope structure to overcome the above drawbacks.

SUMMARY OF THE INVENTION

Therefore, the primary object of the present invention is to provide a kaleidoscope which has a knock down structure to simplify the manufacture and reduce the cost and also save storage space.

Another object of the present invention is to provide a kaleidoscope which has formed therein an interior storage space for receiving and storing small articles so as to provide the kaleidoscope with another function.

A further object of the present invention is to provide a knock down kaleidoscope which allows a user to assemble by oneself for child education purpose.

To achieve the above objects, in accordance with the present invention, there is provided a kaleidoscope which comprises a cylindrical barrel having a top open end and an opposite bottom open end and a top cover and a bottom cover, both having a circumferential wall to be force fit onto the top end and the bottom end of the barrel. The top cover has a hollow triangular frame formed on an inside surface thereof. The bottom cover has formed on an inside surface thereof a flake container in the form of a triangle inside which a plurality of colorful and reflective flakes and other small objects are received in a loose and movable manner. A transparent lid is also received within the flake container to confine the flakes inside the container. A recess is thus defined inside the flake container by the opening of the container and the transparent lid. A prism which is received within the barrel and has a first end fit into the triangular frame of the top cover and a second end fit into the recess inside the container of the bottom cover is releasably secured between the top and bottom covers. An observing window is provided on the top cover to observe the flakes through the prism. The prism defines a space with the barrel for storage of small articles which are received through a slot formed on the top cover. An access hole is provided on the bottom cover and is openably closed by a rubber plug.

The objects, features and advantages of the present invention will be readily understood from the following description of a preferred embodiment thereof with reference to the accompanying drawings, wherein:

DETAILED DESCRIPTION OF THE PREFERRED EMBODIMENT

Figure 1:
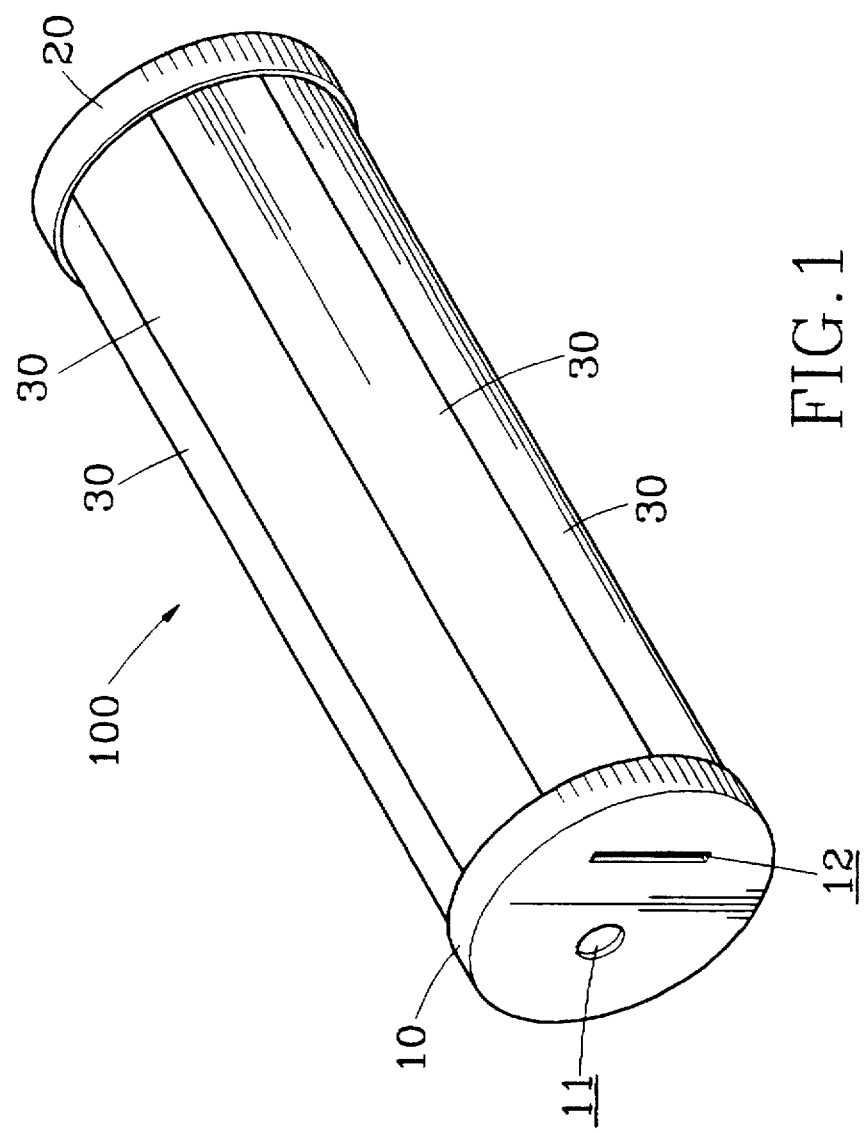
FIG. 1 is a perspective view of a kaleidoscope constructed in accordance with the present invention.

Referring to the drawings and in particular to FIGS. 1–4, wherein a kaleidoscope constructed in accordance with the present invention, general designated at 100, is shown, the kaleidoscope 100 comprises a top cover 10 having a flat portion with a circumferential wall surrounding the flat portion. The top cover 10 has an observing hole or window 11 and an article receiving slot 12 formed on the flat portion thereof. The receiving slot 12 may be configured in accordance with the shapes of for example coins, notes or other small articles. The top cover 10 has formed on an inside surface of the flat portion an inward projected triangular, hollow frame 13 disposed around the observing hole 11.

The kaleidoscope 100 also comprises a bottom cover 20 which, similar to the top cover, comprises a flat portion with a circumferential wall surrounding the flat portion. The bottom cover 20 has formed on an inside surface thereof a flake container 21 defined by a triangular side wall which is sized and positioned to be corresponding to the triangular frame 11 of the top cover 10. The triangular flake container 21 receives therein flakes and other small objects 211 having vivid colors and shining and reflective appearances. The shining and colorful articles 211 are loosely disposed and movable inside the container 21 and is confined therein by means of a transparent lid 212 which is received and fixed within the container 21 in such a manner to leave a distance between the lid 212 and the free edge of the triangular side wall of the container 21 so as to define a triangular recess.

The bottom cover 20 also has an access hole 22 formed thereon which is openably closed by means of a plug member 23. Preferably, the plug member 23 is made of a resilient material, such as rubber.

Figure 2:
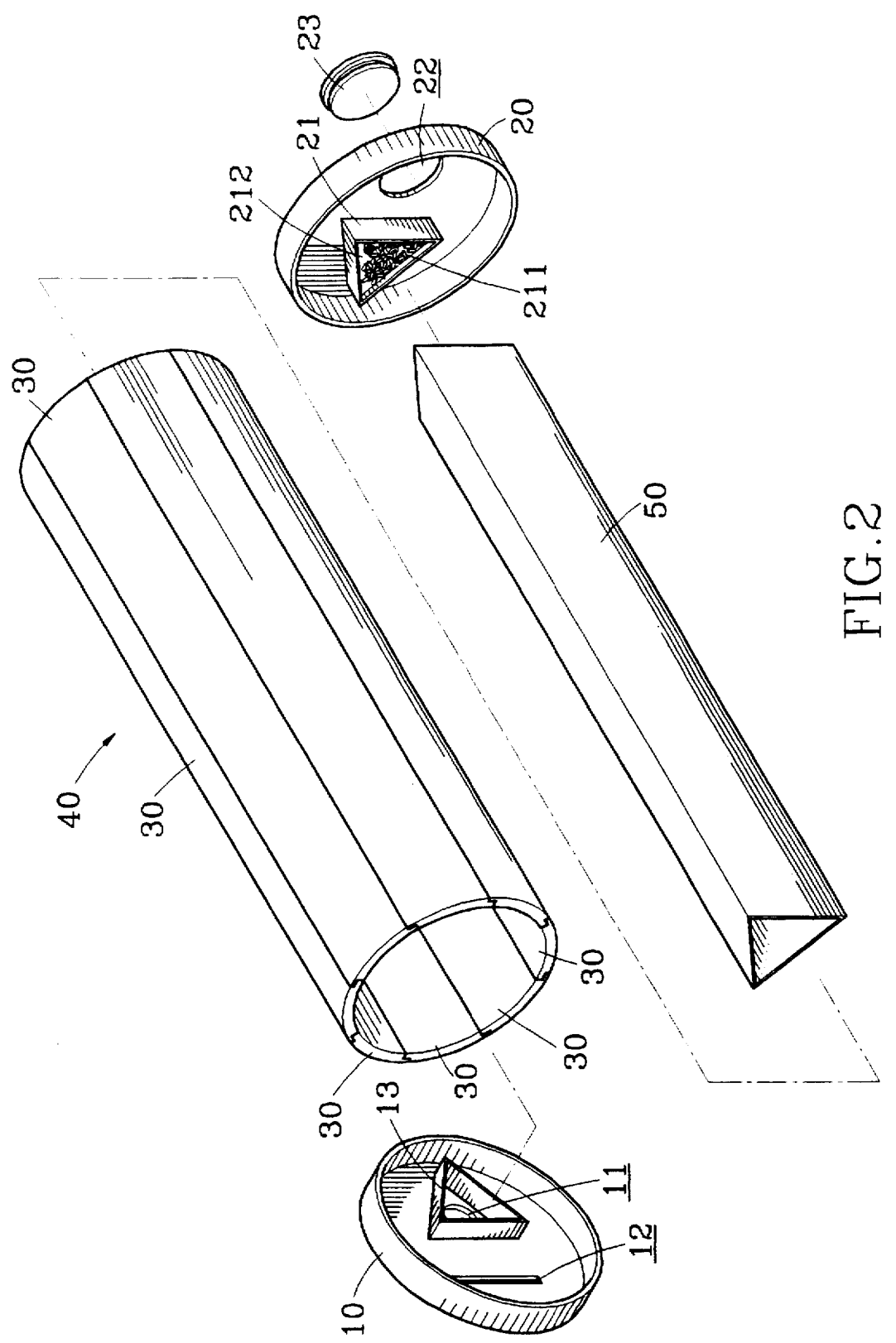
FIG. 2 is an exploded perspective view of the kaleidoscope.
Figure 4:
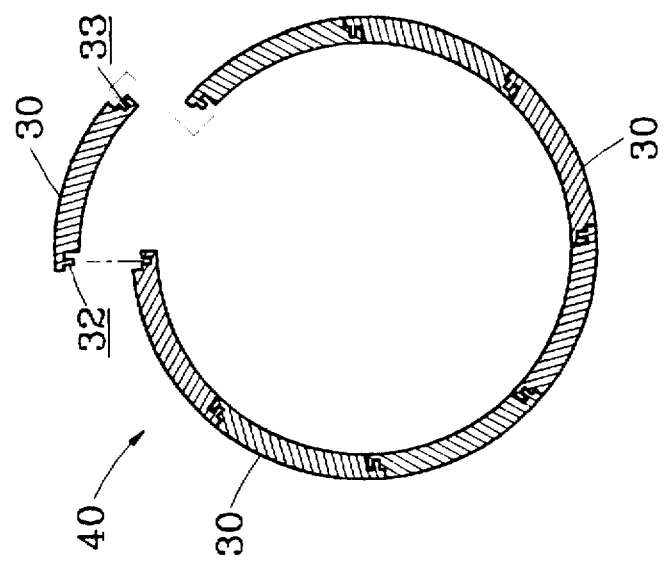
FIG. 4 is a cross-sectional of the barrel of the kaleidoscope with one of the arc strips detached therefrom.
Figure 3:
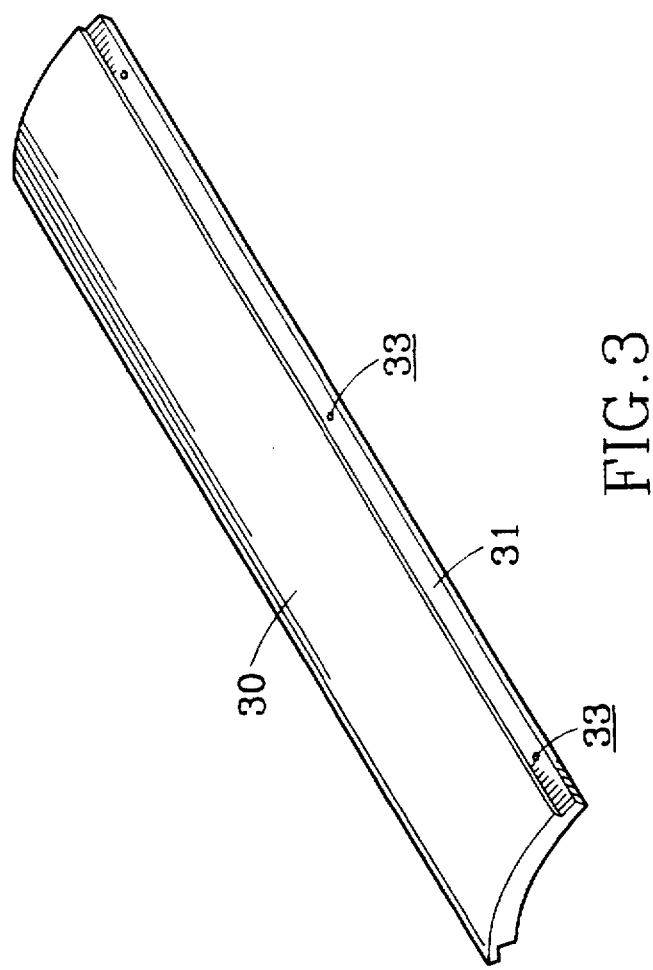
FIG. 3 is a perspective view showing an arc strip that constitutes the barrel of the kaleidoscope.

The kaleidoscope 100 also comprises an elongated barrel or tube 40 which is constituted by a plurality of separate strips 30 (see FIGS. 3 and 4) connected to each other side by side to define a top opening and a bottom opening of the barrel 40, see FIG. 2. The top opening and bottom opening of the barrel 40 are identical in shape to and sized to be force-fit into the top and bottom covers 10 and 20 so as to releasably attach to the top cover 10 and the bottom cover 20. Preferably, the barrel 40 is a cylinder and each of the strips 20 is an arc piece, occupying a portion of the circumference of the cylinder, as shown in FIG. 4, which is preferably a one eighth portion of the cylinder as is illustrated in FIG. 3. Although, the strips 30 may not need to be identical, yet it is preferable to be so.

Each of strips 30 has a first side edge along which an extension 31 is provided and a second opposite edge along which a recess extends. The recess is complementary to the extension so that the recess of one of the strips 30 (the first strip) is capable to receive the extension 31 of the next one of the strips 30 (the second strip) to provide a smooth connection therebetween. The connection between the two adjacent strips 30 is provided by providing pegs 32 along the extension 31 of the second strip 30 which are received within corresponding and mated bores 33 provided on the first strip 30. By attaching the top cover 10 and the bottom cover 20 to the top and bottom openings of the barrel 40 defined by the combined strips 30, the strips 30 are securely fixed to each other. If desired, the top cover 10 and the bottom cover 20 may be secured to the barrel 40 by means of for example adhesive or fasteners.

A prism 50 which may be comprised of three pieces of glasses or acrylic plates has two ends respectively fit into the triangular frame 13 of the top cover 13 and the triangular recess inside the container 21 of the bottom cover 20 so as to have the prism 50 securely fixed between the top cover 10 and the bottom cover 20.

The prism 50 is smaller in size than the barrel 40 so that a space is defined therebetween for storage of small articles (not shown), such as coins, received through the slot 12. The small articles that are stored in the barrel 40 may be accessed through the access hole 22 on the bottom cover 20 by removing the plug member 23.

The separable connection between the strips 30 of the barrel 40 and the releasable mounting between the barrel 40 and the top and bottom covers 10 and 20 allow the kaleidoscope 100 to be assembled/disassembled in a simply and economic manner. Thus the cost of manufacture, storage and transportation may be cut down.

Further, such a structure also allows a user to assemble the kaleidoscope by oneself which provides an education for children. The readily disassembleable structure also allows a user to replace the bottom cover 20 for changing the flakes that are contained in the container 21 on the bottom cover 20 and by doing so, a new kaleidoscope or a kaleidoscope having new patterns may be obtained. This also allows a user to change the configuration and size of the slot 12 on the top cover 10 for receiving different articles into the barrel 40.

The knock down structure of the kaleidoscope allows the kaleidoscope to be detached piece by piece for storage purpose. This minimizes the storage space needed. Also, it is possible to remove the prism 50 to allow the barrel 40 to form a pure storage tank or container.

Figure 5:
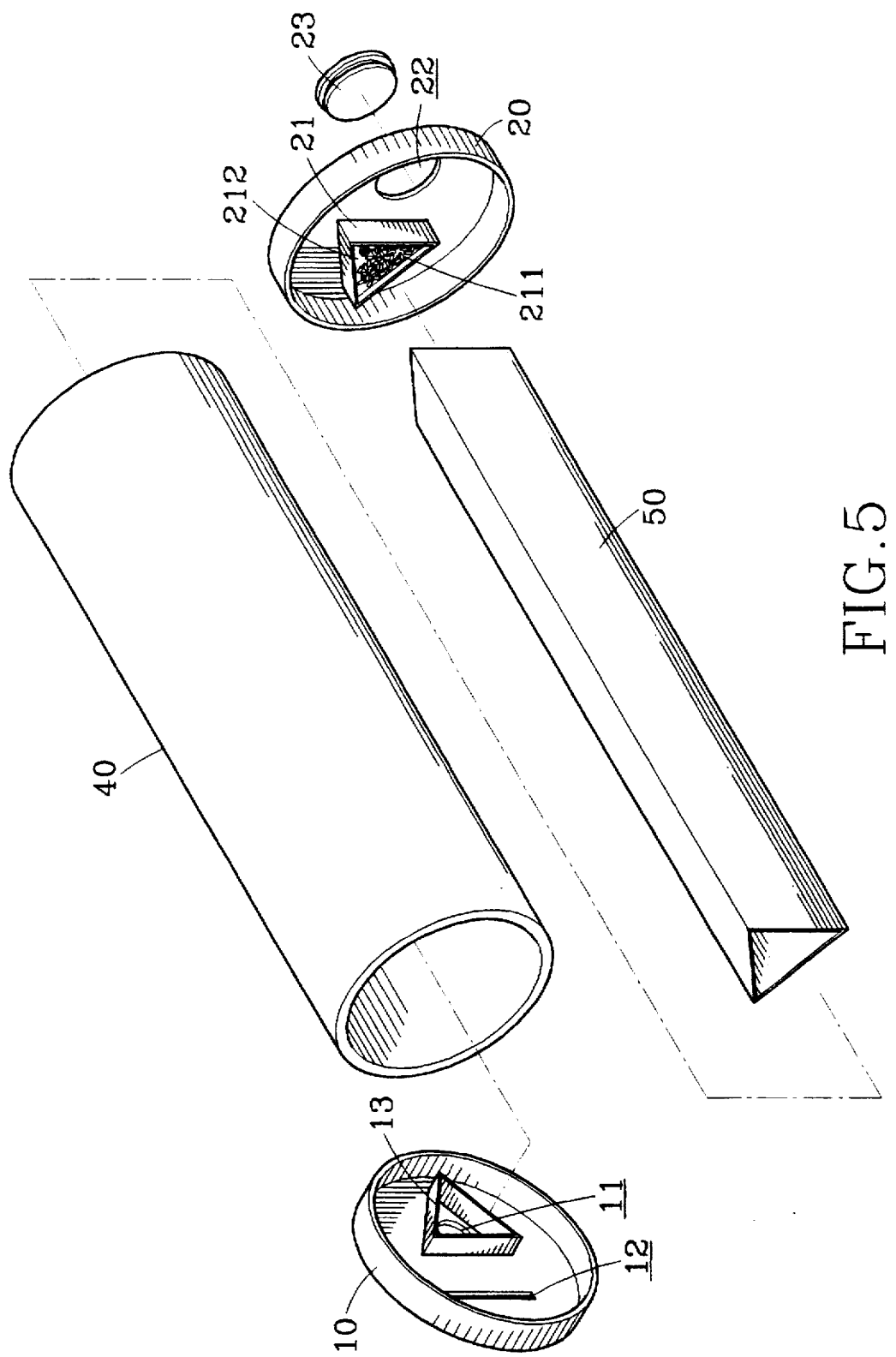
FIG. 5 is an exploded perspective view showing a kaleidoscope constructed in accordance with another embodiment of the present invention.

In FIG. 5, a second embodiment of the present invention is shown. The second embodiment kaleidoscope is substantially identical to the first embodiment kaleidoscope 100 in structure, but with a one piece cylinder to replace the barrel of the first embodiment which is constituted by a plurality of arc strips 30. For environmental protection, the one piece barrel is made of recycled paper material.

The above description is made with respect to the preferred embodiment of the present invention and for those skilled in the art, it is possible to made a variety of modifications and changes to the specific embodiment without departing from the scope of the present invention. All these modifications and changes are considered within the scope of the present invention as defined in the appended claims.

What is claimed is:

1. A kaleidoscope comprising:
    a barrel having a top opening and a bottom opening;
    a top cover having a flat portion with a circumferential wall shaped and sized to be force fit onto the top opening of the barrel, the top cover having a triangular frame formed on an inside surface of the flat portion and an article receiving slot formed on the flat portion;
    a bottom cover having a flat portion with a circumferential wall shaped and sized to be force fit onto the bottom opening of the barrel, the bottom cover having a flake container formed on an inside surface of the flat portion thereof which container is defined by a triangularly-arranged wall corresponding to the triangular frame of the top cover, a plurality of flakes being received within the container and confined therein by means of a transparent lid which is fixed inside the container in such a manner to leave a distance between the lid and free edge of the wall of the container to define a recess corresponding to the triangular frame of the top cover, an access hole being provided on the flat portion of the bottom cover and openably closed by a plug; and
    a prism received within the barrel to define a space therebetween and having a first end fit into the triangular frame of the top cover and a second end fit into the recess of the flake container of the bottom cover, the space between the prism and the barrel being in communication with the receiving slot of the top cover and the access hole of the bottom cover.

2. The kaleidoscope as claimed in claim 1, wherein the barrel comprises a plurality of strips connected to each other side by side, each of the strips having a first side along which an extension is formed and an opposite side along which a recess extends, the recess and the extension being complementary to each other so that the extension of a first one of the strip is complementarily received within the recess of a second, next one of the strips, the extension having a plurality of peg formed thereon receivable within corresponding and mated bores formed on the recess.

3. The kaleidoscope as claimed in claim 2, wherein the barrel is a cylinder having a circumference and wherein the strips are arc strips each taking one eighth of the circumference of the cylindrical barrel.

4. The kaleidoscope as claimed in claim 1, wherein the barrel is made of paper material as a single piece.

5. The kaleidoscope as claimed in claim 1, wherein the plug is made of a resilient material.

6. The kaleidoscope as claimed in claim 5, wherein the resilient material is rubber.

7. The kaleidoscope as claimed in claim 1, wherein the prism comprises three transparent plates.

\* \* \* \* \*